US007060377B2

(12) United States Patent
Liu et al.

(10) Patent No.: US 7,060,377 B2
(45) Date of Patent: *Jun. 13, 2006

(54) LUBRICANT FILM CONTAINING ADDITIVES FOR ADVANCED TRIBOLOGICAL PERFORMANCE OF MAGNETIC STORAGE MEDIUM

(75) Inventors: Jianwei Liu, Fremont, CA (US); Michael Joseph Stirniman, Fremont, CA (US); Jing Gui, Fremont, CA (US)

(73) Assignee: Seagate Technology, Scotts Valley, CA (US)

(*) Notice: Subject to any disclaimer, the term of this patent is extended or adjusted under 35 U.S.C. 154(b) by 76 days.

This patent is subject to a terminal disclaimer.

(21) Appl. No.: 10/687,584

(22) Filed: Oct. 20, 2003

(65) Prior Publication Data

US 2005/0084621 A1 Apr. 21, 2005

(51) Int. Cl.
*G11B 5/725* (2006.01)
(52) U.S. Cl. .................................................. 428/833.4
(58) Field of Classification Search ......... 428/694 TC, 428/694 TF, 833.4
See application file for complete search history.

(56) References Cited

U.S. PATENT DOCUMENTS

| 4,188,434 A | 2/1980 | Loran |
| 4,404,247 A | 9/1983 | Dominguez-Burguette et al. |
| 4,526,833 A | 7/1985 | Burguette et al. |
| 4,529,659 A | 7/1985 | Hoshino et al. |
| 4,552,799 A | 11/1985 | Ryoke et al. |
| 4,601,950 A | 7/1986 | Iida et al. |
| 4,664,963 A | 5/1987 | Sakai et al. |
| 4,693,927 A | 9/1987 | Nishikawa et al. |
| 4,786,544 A | 11/1988 | Saito |
| 4,839,244 A | 6/1989 | Tsukamoto |
| 4,849,305 A | 7/1989 | Yanagisawa |
| 5,049,410 A | 9/1991 | Johary et al. |
| 5,128,216 A | 7/1992 | Ng |
| 5,137,784 A | 8/1992 | Suzuki et al. |
| 5,178,954 A | 1/1993 | Norman et al. |
| 5,331,487 A | 7/1994 | Gregory et al. |
| 5,489,480 A | 2/1996 | Usuki et al. |
| 5,536,577 A | 7/1996 | Murayama et al. |
| 5,587,217 A | 12/1996 | Chao et al. |
| 5,618,639 A | 4/1997 | Ohno et al. |
| 5,677,051 A | 10/1997 | Ueda et al. |
| 5,718,942 A | 2/1998 | Vurens et al. |
| 5,820,964 A | 10/1998 | Nakakawaji et al. |
| 5,858,536 A | 1/1999 | Yanagisawa |
| 5,869,186 A | 2/1999 | Usuki et al. |
| 5,908,817 A * | 6/1999 | Perettie et al. .............. 508/422 |
| 6,001,446 A | 12/1999 | Nakada et al. |
| 6,001,479 A | 12/1999 | Yokosawa et al. |
| 6,080,486 A * | 6/2000 | Falcone et al. ............. 428/421 |
| 6,099,762 A | 8/2000 | Lewis |
| 6,099,896 A | 8/2000 | Stirniman |
| 6,117,964 A | 9/2000 | Falcone |
| 6,673,429 B1 * | 1/2004 | Ma et al. .................... 428/216 |
| 6,686,019 B1 * | 2/2004 | Liu et al. ................... 428/65.8 |
| 6,753,060 B1 * | 6/2004 | Liu et al. ................... 428/65.4 |

FOREIGN PATENT DOCUMENTS

| JP | 63102038 | 5/1988 |
| JP | 63225918 | 9/1988 |
| JP | 63237216 | 10/1988 |
| JP | 3134818 | 6/1991 |
| JP | 8319491 | 12/1996 |
| JP | 10251676 | 9/1998 |

OTHER PUBLICATIONS

G. Barth et al., "Characterizing the Surface Chemistry of Magnetic Disk Media through Surface Derivatization", Solid State Technology, p. 119-121, Jan. 1989.

M. Yanagisawa, "Adsorption of perfluoro-polyethers on carbon surfaces", ASME/STLE Tribology Conference, p. 25-32, Oct. 16-20, 1994.

B. DeKoven et al., Chemistry/orientation of lubricants on hard disk magnetic media substrates ($CH_x$ and $CN_x$) using near edge x-ray absorption fine structure (NEXAFS), (abstract), MRS Spring 98 Meeting, Symposium L, Materials for High-density Magnetic Recording, Apr. 12-16, 1998.

"Magnetic Materials", Annual Report, Ceramics Division, NIST, p. 1,6, Jul. 21, 1999.

N. Shukla et al., The interaction of $CF_3CH_2OH$ and $(CF_3CF_2)_2O$ with amorphous carbon films, *Langmuir* 2000, 16, 6562-6568, May 15, 2000.

* cited by examiner

*Primary Examiner*—Stevan A. Resan
(74) *Attorney, Agent, or Firm*—Morrison & Foerster LLP (57) ABSTRACT

A magnetic recording medium having a lubricant film containing a non-phase separated additive and a lubricant a base layer, wherein the additive is bonded to the base layer, for better and faster mobility of a lubricant to ensure rapid healing of areas of the medium that have been depleted of the lubricant, and a method of manufacturing thereof, is disclosed.

8 Claims, 4 Drawing Sheets

LUBRICANT FILM CONTAINING ADDITIVES FOR ADVANCED TRIBOLOGICAL PERFORMANCE OF MAGNETIC STORAGE MEDIUM

FIELD OF INVENTION

The present invention relates to recording media having one or more layers of lubricants, particularly magnetic recording media having a non-phase separated film containing an additive and a lubricant.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head. Because the read-write heads can contact the disc surface during operation, a thin layer of lubricant is coated on the disc surface to reduce wear and friction.

Figure 1A:
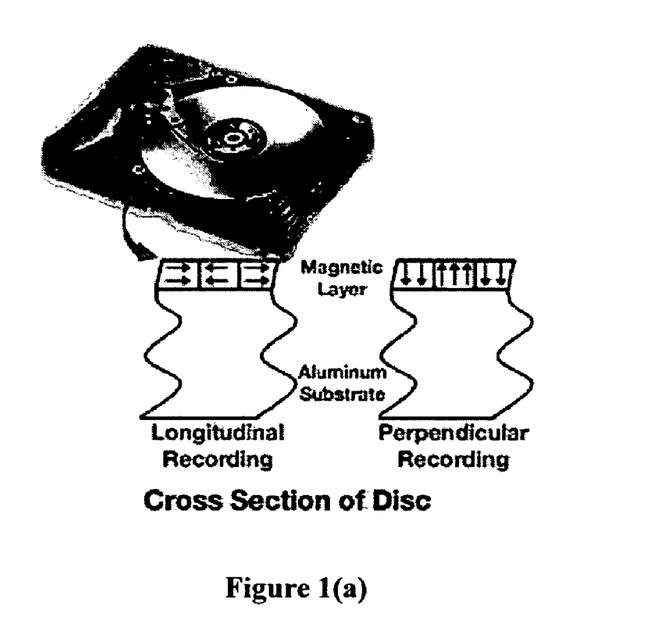
FIG. 1(a) schematically shows a magnetic disk recording medium comparing longitudinal or perpendicular recording.

Magnetic thin-film media, wherein a fine grained polycrystalline magnetic alloy layer serves as the active recording medium layer, are generally classified as "longitudinal" or "perpendicular," depending on the orientation of the magnetic domains of the grains of the magnetic material. FIG. 1(a) shows a disk recording medium and a cross section of a disc showing the difference between longitudinal and perpendicular recording. Even though FIG. 1(a) shows one side of the non-magnetic disk, magnetic recording layers are sputter deposited on both sides of the non-magnetic aluminum substrate of FIG. 1(a). Also, even though FIG. 1(a) shows an aluminum substrate, other embodiments include a substrate made of glass, glass-ceramic, NiP/aluminum, metal alloys, plastic/polymer material, ceramic, glass-polymer, composite materials or other non-magnetic materials.

Figure 1B:
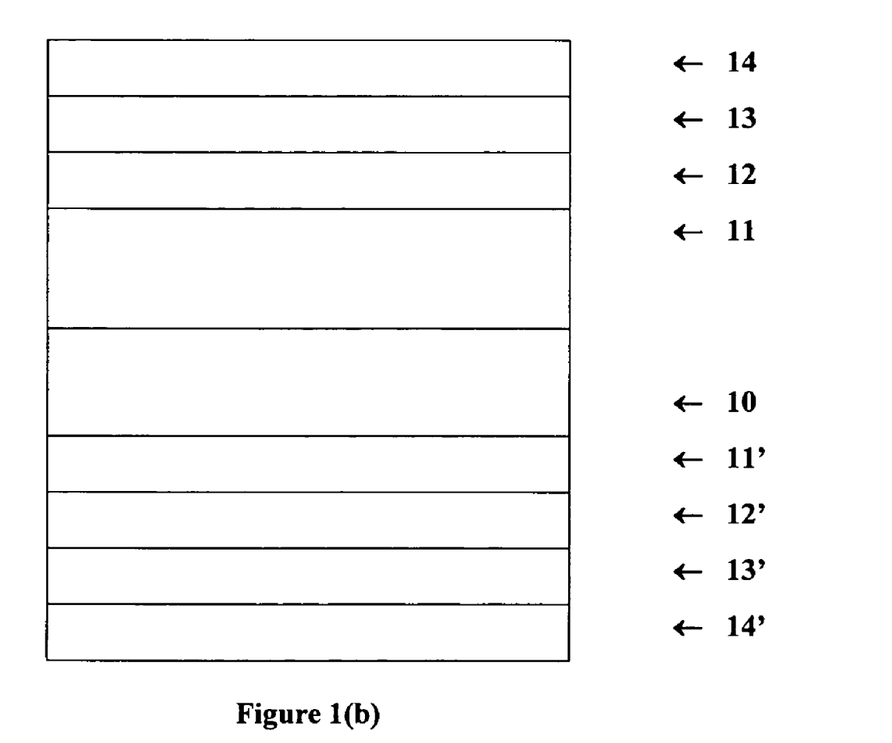
FIG. 1(b) schematically shows a conventional magnetic recording medium (Prior Art).

A conventional longitudinal recording disk medium is depicted in FIG. 1(b) and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat 14, 14' to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1(b), but does not comprise Cr-containing underlayers Lubricants are either applied to the recording media by a vapor phase lubrication process or by a dip coating technique. When lubricants are applied using a dip coating technique, the lubricant is dissolved in a solvent at low concentration, and the media are dipped into the solution and withdrawn, or the solution is pumped over the media and then drained away. As the media are lifted or the solution drained a meniscus of solution is dragged along the disc's surface, and as the solvent evaporates a thin film of the nonvolatile lubricant is left on the disc. The amount of lubricant in the film is controlled through varying either the concentration of lubricant in the solution or the rate at which the media is lifted or the solution drained, or both.

One or more additives are typically added to the lubricant to promote the mobility of the lubricant. During the course of this invention, it was discovered that the prior art lubrication processes result in a lubricant film structure having separate phases of the additive and the lubricant. Therefore, improved recording media and a process for manufacturing the recording media is needed to avoid the problems associated with the media manufactured by the prior art lubrication processes.

SUMMARY OF THE INVENTION

This invention relates to a method of manufacturing recording media comprising depositing a base layer, the base layer being a carbon overcoat, coating the base layer with an additive, exposing the base layer coated with the additive to UV to bond the additive to the base layer and subsequently coating a lubricant to the base layer to produce a lubricant film wherein the additive forms an additive layer bonded to the base layer, the additive layer being of a thickness greater than 1 Å. The method could further comprise degreasing the base layer after exposing the base layer coated with the additive to UV but prior to coating a lubricant to the base layer to produce a lubricant film. Preferably, the lubricant film comprises the additive and the lubricant and the additive is not phase separated from the lubricant. In one variation, the coating the base layer with an additive is by a liquid or vapor deposition process. In another variation, a majority of binding sites of the base layer capable of pair-wise binding to molecules of the lubricant are bound to molecules of the additive. Preferably, the base layer coated with the additive and exposed to UV provides a surface mobility to the lubricant molecules that is higher than a surface mobility provided by another base layer coated with the additive and not exposed to UV. In one variation, a formula of a molecule of the lubricant has same groups at both ends of the formula. In another variation, a formula of a molecule of the lubricant has different groups at both ends of the formula. Preferably, the additive comprises Bis(4-fluorophenoxy)-tetrakis(3-trifluoromethyl phenoxy) cyclotriphosphazene and the lubricant comprises a fluorinated oil. Preferably, the lubricant film has a thickness in a range of about 0.5 nm to about 3 nm.

Another embodiment is a recording media comprising a base layer, the base layer being a carbon overcoat, and a lubricant film comprising a lubricant and an additive bonded to the base layer, the additive forming an additive layer bonded to the base layer, the additive layer being of a thickness greater than 1 Å. Preferably, the additive is bonded to the base layer by exposing the base layer coated with the additive to UV. In one variation, the lubricant has a $M_w/M_n$ ratio between 1 and 1.6.

Yet another embodiment is a method for preventing phase separation of an additive in a lubricant film comprising a lubricant and the additive, the method comprising depositing a base layer, the base layer being a carbon overcoat, coating the base layer with the additive, exposing the base layer coated with the additive to UV to bond the additive to the base layer and subsequently coating the lubricant to the base layer to produce the lubricant film wherein the additive forms an additive layer bonded to the base layer.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Almost all the manufacturing of the disks takes place in clean rooms, where the amount of dust in the atmosphere is kept very low, and is strictly controlled and monitored. The disk substrates come to the disk fabrication site packed in shipping cassettes. For certain types of media, the disk substrate has a polished nickel-coated surface. The substrates are preferably transferred to process cassettes to be moved from one process to another. Preferably, the cassettes are moved from one room to another on automatic guided vehicles to prevent contamination due to human contact.

The first step in preparing a disk for recording data is mechanical texturing by applying hard particle slurry to the polished surface of the substrate and to utilize proper tape materials on circumferential motion disk to create circumferentially texture grooves. This substrate treatment helps in depositing of a preferred underlayer crystallographic orientation and subsequently helps preferentially growth of magnetic recording material on the substrate. During the texturing process, small amounts of substrate materials get removed from surface of the disk and remain there. To remove this, the substrate is usually washed. Also, techniques for polishing the surface of the non-magnetic substrate of a recording medium use slurry polishing, which requires wash treatment. Thus, disk substrates are washed after texturing and polishing. However, wash defects could be one of the top yield detractors.

A final cleaning of the substrate is then done using a series of ultrasonic, megasonic and quick dump rinse (QDR) steps. At the end of the final clean, the substrate has an ultra-clean surface and is ready for the deposition of layers of magnetic media on the substrate. Preferably, the deposition is done by sputtering.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the top layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

Reliability of hard disks is depends on the durability of the thin film media. As the thickness of the protecting layers, namely carbon overcoat and lubricants, is being trimmed down continuously, a more integrated protection structure is needed. Lubrication additives, such as Bis(4-fluorophenoxy)-tetrakis(3-trifluoromethyl phenoxy) cyclotriphosphazene (X1P), improve tribological performance and corrosion resistance of thin film media. Dip-lubing process includes immersing disks into a solution containing both lubricant and additives, and slowing removing disks from the lubricant solution. Certain amount of lubricant and additive is adsorbed on the disk overcoat by controlling the solution concentration and the drain rate. However, during the course of this invention, it was discovered that there are several problems in the one-step dip-lubing process. Since lubricant, such as perfluoropolyether (PFPE) and lubricant additives, such as X1P, have very limited miscibility, phase separation and head smear occur occasionally. In addition, PFPE lubricant and lubricant additives have very different adsorption rate on carbon overcoat. Thus, it is difficult to control the exact lubricant and additives content on disks. As PFPE lubricant is usually preferentially adsorbed on carbon overcoat compared to X1P, lubricant bath composition changes over time. This forces constant adjustment of lubricant solution concentration. Even so, repeatable lubricant composition control is often unmanageable for some lubricant/additive combination.

In short, during the course of this invention, the applicants discovered the following deficiencies in the dip-lubing methods: (1) difficulty to control the concentration of both the additive and lubricant over long production period; (2) phase separation of the additive and the lubricant resulting in (a) formation of droplets of ~1 micron diameter; these droplets are hit by the head which flies at a flying height of ~5 nm, (b) increased friction, (c) increased stiction, (d) increased noise and (e) loss of durability and reliability.

Particularly, because both the surface of the media and the recording head are so smooth, it becomes increasingly difficult to avoid stiction. Stiction is the result of having two completely smooth surfaces resting against each other with a lubricant in between; they want to stick together. For example, if two pieces of glass were set one on top of the other with some water or lubricant in between, it would be very difficult to pull them apart. The same is true when a recording head lands on a media surface during a power-down cycle. When the head attempted to take off, it would not be able to due to stiction.

An example to illustrate the discovered problem is a ZTETRAOL/X1P lubricant system. Good CSS (contact-start-stop) performance has been observed for this lubricant system. However, the lubricant system cannot be applied in the production because it was found to be very difficult to control the X1P content.

This invention overcomes these discovered problems and involves a two-step lubing process to coating storage medium with a lubricant film containing lubricant additives, such as X1P. A layer of lubricant additives is coated on carbon overcoat by dip-lubing or vapor-lubing, following by ultraviolet radiation to achieve certain bonding. Excess additives are removed by either a vapor degrease or a solvent wash. A second step dip-lubing then coats lubricant on medium to the desirable thickness.

The steps in one embodiment of the two-step process are: (1a) coating a media surface with an additive by dip or vapor lubrication to form an additive coated media surface, (1b) exposing the additive coated media surface to UV to bond the additive to the media surface, and (1c) optionally degreasing the additive coated media surface; and (2) coating a lubricant to the additive coated media surface.

The magnetic recording media by the two-step process have a non-phase separated film containing an additive and a lubricant. In this non-phase separated film the concentration of the additive could be uniform, discrete and different in layers, or continuously varying through the thickness of the film. However, in either case, the additive is not phase separated from the lubricant.

One embodiment of this invention is directed to a method of coating a substrate, particularly recording media (recording discs), with a lubricant wherein the additive not phase separated and a recording medium made by this method. Another embodiment of this invention is a recording medium comprising a multiple-layer lubricant wherein there are actual surfaces between distinctly separate layers having a varying composition of the additive in the lubricant. Each slice in the layer is an approximation of a thin layer in which the lubricant, e.g., FOMBLIN ZDOL®, has approximately constant concentration throughout the thin slice even though the lubricant film through the thickness could have a varying composition from one surface to the other surface of the layer. A concentration is "approximately constant" when the ratio of minimum concentration to maximum concentration is 0.9 or more. Each slice could be of an atomic layer thickness or more, i.e., 0.1 Å or more. Yet another example of forming a multiple-layer lubricant on a recording medium is by depositing distinctly separate multiple layers or by depositing a "single-layer" having a graded composition in the lubricant in the layer.

Lubricants typically contain molecular weight components that range from several hundred Daltons to several thousand Daltons. The molecular components of low molecular weight will have a higher vapor pressure than the high molecular weight components. Persons of ordinary skill in this art recognize that lubricant molecular weights are typically determined by methods that measure number average molecular weight. Thus the term "molecular weight" in this application refers to number average molecular weight unless the term "molecular weight" has a prefix such as "weight," "viscosity," etc. to designate that the molecular weight is different than a number average molecular weight.

The lubricants typically applied to recording media include polyfluoroether compositions that may be terminally functionalized with polar groups, such as hydroxyl, carboxy or amino. The polar groups provide a means of better attaching or sticking the lubricant onto the surface of the recording media. These fluorinated oils are commercially available under such trade names as FOMBLIN Z®, FOMBLIN ZDOL®, FOMBLIN ZTETRAOL®, FOMBLIN ZDOL-TX®, FOMBLIN Z15®, FOMBLIN Z25®, FOMBLIN Am2001®, FOMBLIN Z-DISOC® (Montedison); DEMNUM® (Daikin) and KRYTOX® (Dupont). The chemical structures of some of the FOMBLIN lubricants are shown below.

Fomblin Z: Non-Reactive End Groups

Fomblin Zdol: Reactive End Groups

Fomblin AM2001: Reactive End Groups

Fomblin Ztetraol: Reactive End Groups

In this invention, the surface mobility of a lubricant is influenced by the state of the surface that the lubricant is covering, which is generically referred to in this application as the "base layer." For an amorphous carbon base layer, which could also function as a protective overcoat for media, the surface contains binding sites that interact with lubricant molecules. Due to the amorphous nature of the surface, these surface sites have different strengths in their binding energy with a lubricant. In many situations, the protective layer is the base layer, but this is not always necessarily the case.

The high-energy sites tend to bond the molecules of a material such as a lubricant more strongly and, hence, reduce their mobility. The interactions between the high-energy surface sites and the molecules of a material are usually pair-wise, namely, once a site is occupied by one lubricant molecule, this site is no longer capable of binding another lubricant molecule.

One embodiment of this invention pertains to a magnetic recording media formed by a two-step process wherein the additive is first coated and bonded to the base layer by UV exposure and the lubricant is then coated to the additive coated base layer. The bonded additive layer could be a sub-monolayer, monolayer or multilayer thick at an atomic level and could interact strongly with a carbon surface of the base layer after UV exposure. "Strong interaction" means that the interaction between the additive molecules and the binding sites on the surface of a base layer is pair-wise. "Weak interaction" on the other hand would mean that the interaction between a material and the binding sites on the surface of a base layer is not pair-wise.

The purpose of the bonded additive layer to lower the surface energy by blocking the high binding energy sites of the base layer. This layer can either be deposited by an in-situ vapor deposition process, or by dip-lube plus a post lube bonding-treatment and then UV treated to bond the additive layer to the base layer. On top of this bonded additive layer, a second layer of a regular lubricant such as ZDOL or other functional and non-functional perfluoropolyethers, can be applied by either dipping or vapor deposition. Because additive layer molecules are bonded to the base layer, the surface mobility of the lubricant in this second layer is greatly enhanced and the additive molecules do not phase separate from the lubricant molecules even though the additive and lubricant molecules would otherwise phase separate in a mixture containing these molecules wherein the additive molecules were not bonded to any base layer.

In the embodiment of this invention, the lubricant molecules interpenetrate and diffuse through the bonded additive molecules. Therefore, the magnetic recording media with bonded, non-phase separated additive molecules and a non-phase separated lubricant interpenetrating the additive molecules would have better tribological performance and wear durability. The lack of phase separation of the lubricant will enable fast recovery (repair) of a worn spot in between contacts.

The thickness of the bonded additive layer is less than 2 nm, preferably, less than 1.5 nm, more preferably less than 1 nm, and most preferably less than 0.5 nm. The thickness of the lubricant film should be at least 0.5 nm, preferably at least 1 nm, and more preferably at least 1.2 nm and will generally be below 3 nm, preferably in the range from 1 nm to 3 nm. Molecular weight components of particular interest range from 1 kD to 10 kD, preferably from 2 kD to 8 kD.

One way of describing a distribution of molecular components of a polymer, i.e., polydispersity, is to compare the weight average molecular weight defined as $$M_w = \Sigma m_i M_i / \Sigma m_i$$

where $m_i$ is the total mass of molecular component in the polymer having a molecular weight $M_i$, with the number average molecular weight defined as $$M_n = \Sigma N_i M_i / \Sigma N_i$$

where $N_i$ is the total number of each molecular component in the polymer having a molecular weight $M_i$. The weight average molecular weight ($M_w$) of a polymer will always be greater than the number average molecular weight ($M_n$), because the latter counts the contribution of molecules in each class $M_i$ and the former weighs their contribution in terms of their mass. Thus, those molecular components having a high molecular weight contribute more to the average when mass rather than number is used as the weighing factor.

For all polydisperse polymers the ratio $M_w/M_n$ is always greater than one, and the amount by which this ratio deviates from one is a measure of the polydispersity of the polymer. The larger the $M_w/M_n$ ratio, the greater the breadth of the molecular weight distribution of the polymer.

The molecular weight distribution of the vapor phase can be sampled by condensation of the vapor onto a suitable surface, followed by analysis of the condensate in a calibrated size exclusion chromatography system.

It is desirable that the fresh lubricant has a relatively narrow molecular weight distribution of molecular components. In practice, the narrower the distribution, the easier it will be to maintain a steady-state concentration of one or more components in the vapor. For example, if the highest and lowest molecular weight components in the polymer have very similar molecular weights, their vapor pressures will also be very similar. On the other hand, if the molecular weights (vapor pressures) are dramatically different, heating of the lubricant will require much greater temperature and process control for a steady state concentration to be maintained. The lubricant used in the invention should have a $M_w/M_n$ ratio between 1 and 1.6, preferably between 1 and 1.3, more preferably between 1 and 1.2.

The invention can be practiced with any commercial lubricant with a relatively large or small polydispersity, or with a lubricant that has been pre-fractionated to obtain a lubricant with a relatively small polydispersity. The preferred embodiment of the invention does not involve pre-fractionation of the lubricant. However, pre-fractionated lubricants may be used to provide relatively narrow molecular weight lubricant. If a pre-fractionated lubricant is used in the invention, the pre-fractionated lubricant can be obtained by distillation, chromatography, extraction, or other techniques that allow separation by molecular weight.

This invention could be practiced with any carbon overcoat underneath the first layer. The term "carbon overcoat" is not limited to pure carbon overcoat but could be any material containing carbon, preferably elemental carbon, such as Ar sputtered carbon, hydrogenated carbon, nitrogen containing carbon, fluorine containing carbon, Si-containing carbon and diamond-like carbon.

The recording media on a non-textured or textured substrate and could be fabricated with DC magnetron sputtering except carbon films could be made with ion beam sputtering. In accordance with embodiments of this invention, a NiP layer is deposited on a direct texture substrate, such as a glass or glass-ceramic substrate, or on a substrate which is non-textured and the NiP layer is then textured to form a seedlayer. The texture of the textured glass substrate, for example, can be induced by an electron-beam (e-beam) to produce patterns on the surface of the glass substrate without the use of lithography and etching. The surface of the NiP layer is optionally oxidized. Subsequently, a Cr-containing underlayer is deposited on the seed layer. Then, a Co-containing magnetic layer is deposited on the Cr-containing underlayer. Another embodiment of this invention could include depositing a thin intermediate magnetic layer on the underlayer and depositing the magnetic layer on the intermediate layer.

In a preferred embodiment, the magnetic layer is Co—Cr—Pt—B. In another embodiment, the Co—Cr—Pt—B comprises at least 8–26 atomic percent Cr, 5 to 21 atomic percent Pt, 2 to 18 atomic percent B, and Co in the balance.

The thickness of magnetic films and underlayer films is measured by X-ray fluorescence (XRF). By monitoring the intensity of Co, the primary constituent of the magnetic film, and Cr, the typical underlayer material, correlations to thin film thicknesses can be established. X-ray fluorescence is also useful in establishing composition of the sputtered binary, ternary, or quaternary magnetic films. In a similar manner, carbon overcoat thickness can be measured by measuring the carbon excitation intensity.

Another technique for determining carbon overcoat thickness is ellipsometry. If one knows the optical properties (index of refraction n and absorption coefficient k) of the magnetic layer and the carbon layer, the ellipticity of a reflected laser beam can be analyzed and a thickness calculated.

Lubricant or additive thickness can also be accurately measured by using ellipsometry. More common, however, for lubricant thickness quantification is the use of Fourier transform infrared (FTIR) spectroscopy. The perfluoropolyethers have very specific molecular vibrations in the infrared region at about 1250 $cm^{-1}$. The intensity of these bands is proportional to thickness. In the examples below, the thicknesses of the additive and lubricant were measured by FTIR calibrated by ellipsometry.

EXAMPLES

Example 1

Figure 2:
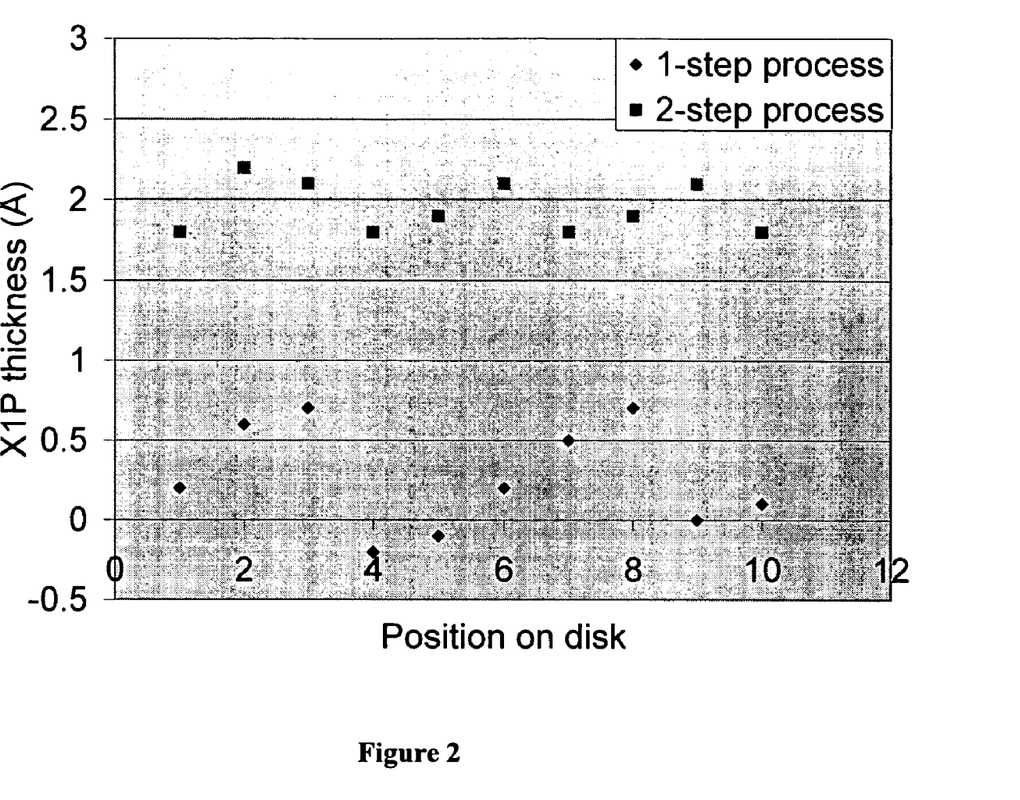
FIG. 2 shows X1P content at various positions on disks dip-lubed with (a) one-step process of 12 Å ZTETRAOL/0.5 Å X1P; (b) two-step process of 2 Å X1P in 12 Å ZTETRAOL.

One example to demonstrate the benefit of the two-step lubing process is the ZTETRAOL lubricant film containing X1P. ZTETRAOL is a PFPE lubricant that has many excellent tribological properties, such as extremely low stiction/friction, low lubricant pickup, and good corrosion resistance. However, the CSS durability of ZTETRAOL is unsatisfactory for thin carbon overcoat and low fly height condition. Addition of X1P as additive in ZTETRAOL improves CSS durability significantly. However, since ZTETRAOL has much strong bonding propensity on carbon overcoat than X1P, it was not possible to control X1P content on disks using a single step dip-lubing process. In addition, due to lack of bonding site for X1P, any excess "free" X1P migrates and aggregates on surface of medium and forms high X1P domains. This behavior is evidenced by the big variation of X1P content on disk surface (FIG. 2). Such uneven distribution of X1P limits X1P content below 0.5 Å on disks induces phase separation, which is detrimental to the tribological performance. FIG. 2 shows X1P content at various positions on disks dip-lubed with (a) one-step process of 12 Å ZTETRAOL/0.5 Å X1P; (b) two-step process of 2 Å X1P in 12 Å ZTETRAOL.

The two-step lubing process of this invention was unexpectedly found to resolve effectively the problem of phase separation of X1P. Since X1P is first bonded on medium by UV irradiation before the second step lubing of ZTETRAOL, precise X1P content could be achieved. Moreover, X1P is evenly distributed over the entire disk surface due to no bonding competition between X1P and ZTETRAOL as in the one-step dip lubing process. Besides, a much higher X1P content could be incorporated into the ZTETRAOL film without phase separation. Excellent tribological performance was observed. On a 30 Å carbon overcoat made by using filtered cathodic arc (FCA), there was no glide yield for all of the traditional lubricant design, including ZDOL, ZTETRAOL and one-step dip-lubing of ZTETRAOL/X1P and RMW/X1P. On the other hand, quite unexpectedly, the same medium with ZTETRAOL/X1P using the two-step process produced remarkably good glide yield. Furthermore, the glide good medium was able to pass a 20k 33/80 CSS test.

Example 2

Figure 3A:
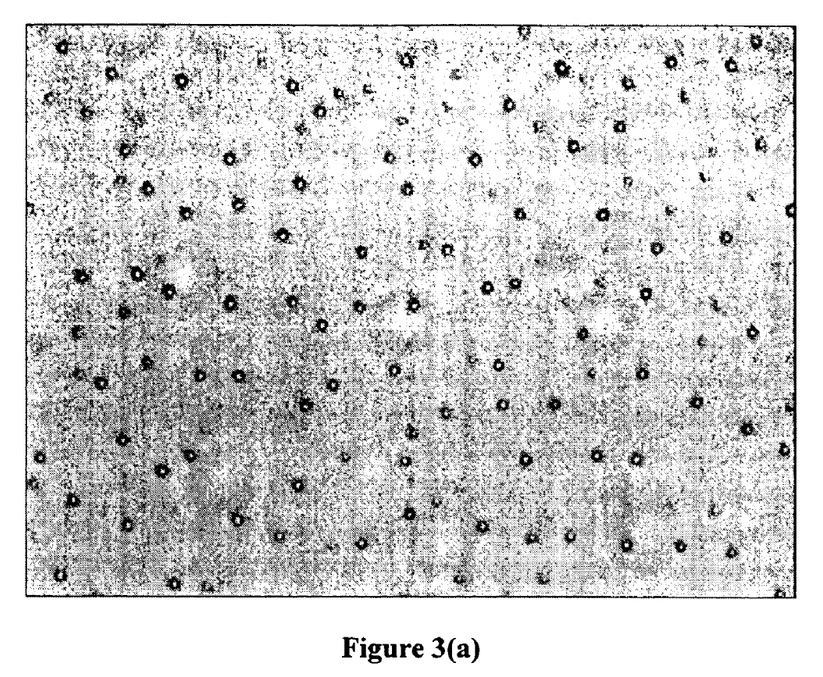
FIG. 3(a) shows phase separation in the one-step dip-lubing of ZTETRAOL/X1P.
Figure 3B:
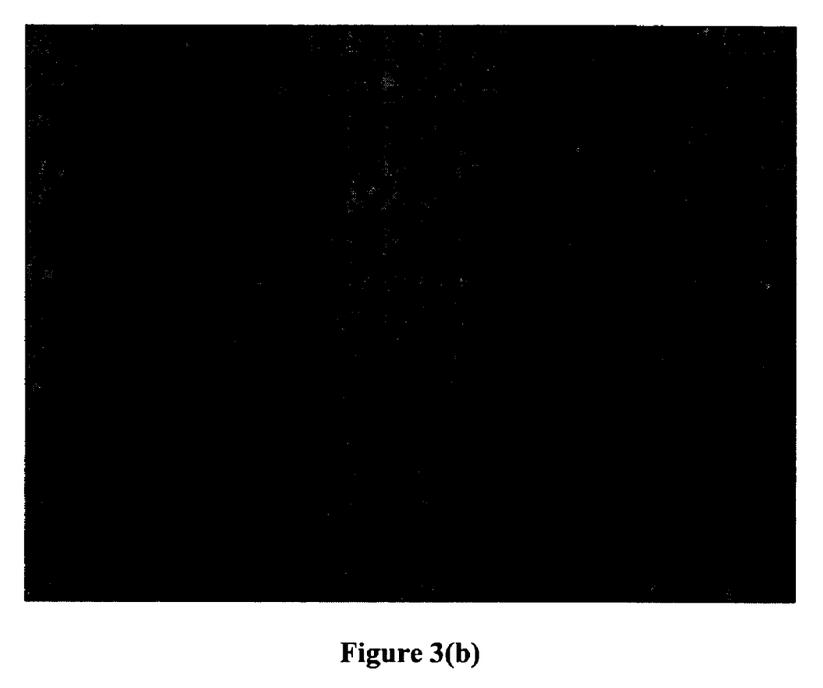
FIG. 3(b) shows no phase separation in two-step lubing of ZTETRAOL/X1P (the circles are laser texture).

As explained above, one unexpected advantage of the method of this invention is that neither the additive nor the lubricant is phase separated. The disks lubricated by the one-step and two-step processes whose performance are demonstrated in FIG. 2 were tested by an optical method to check for phase separation and the results are shown in FIGS. 3(a) and 3(b). In particular, FIGS. 3(a) and 3(b) prove that the one-step dip-lubing of ZTETRAOL/X1P produces phase separation while the two-step method of this invention does not. In FIG. 3(a), the randomly dispersed small round circles are phase separated particles of the additive X1P in a continuous phase of the lubricant ZTETRAOL. On the other hand, the large faint circles that are substantially uniformly spaced in FIG. 3(a) are the circles due to laser texturing of the substrate. FIG. 3(b) shows no phase separation of the additive X1P by the two-step addition of ZTETRAOL/X1P while it only shows the circles due to laser texture of the substrate.

Example 3

Figure 4:
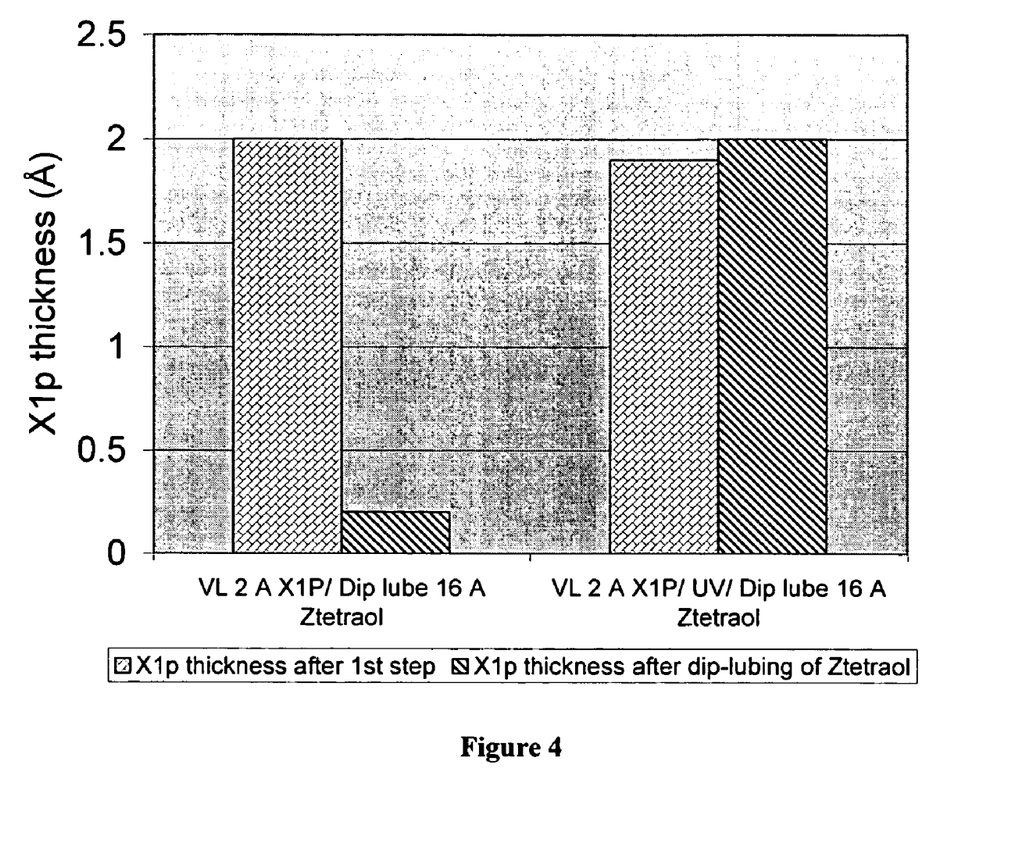
FIG. 4 shows the thickness of X1P before and after the second step of dip lubing without and with UV exposure to the X1P additive layer applied to the base layer during the first step.

Finally, to determine the effect of UV exposure in the two-step process, disks were manufactured by the two-step process similar to the disks of Example 1 except some of the disks were not exposed to UV. FIG. 4 shows the thickness of X1P before and after the second step of dip lubing without and with UV exposure to the X1P additive layer applied to the base layer during the first step. FIG. 4 shows that without exposing the X1P additive layer to UV, most of it is possibly washed away during the second step of dip lubing while after exposing the X1P additive layer to UV, most remains on the base layer even after the second step of dip lubing.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A recording media comprising a base layer, the base layer being a carbon overcoat, an additive layer comprising an additive bonded to the base layer and a lubricant film comprising a lubricant and the additive, in this order, the additive layer being of a thickness greater than 1 Å, wherein on the recording media the additive is not phase separated from the lubricant even though the additive and the lubricant otherwise phase separate in a mixture containing the additive and the lubricant wherein the additive in the mixture is not bonded to the base layer.

2. The media of claim 1, wherein a majority of binding sites of the base layer capable of pair-wise binding to molecules of the lubricant are bound to molecules of the additive.

3. The media of claim 1, wherein the base layer having the additive UV bonded thereon provides a surface mobility to the lubricant molecules that is higher than a surface mobility provided by another base layer coated with the additive and not exposed to UV.

4. The media of claim 1, wherein the lubricant comprises a molecule that has same groups at both ends of the molecule.

5. The media of claim 1, wherein the lubricant comprises a molecule that has different groups at both ends of the molecule.

6. The media of claim 1, wherein the lubricant film has a thickness in a range of about 0.5 nm to about 3 nm.

7. The media of claim 1, wherein the additive is bonded to the base layer by exposing the base layer coated with the additive to UV.

8. The media of claim 1, wherein the lubricant has a $M_w/M_n$ ratio between 1 and 1.6.

* * * * *